3,451,765
METHOD OF TREATING SPENT PULP LIQUOR BY ADDING GAS-EVOLVING METALS THERETO
Frederick A. Schleindl, c/o Pyrochemical Corporation, 50 E. 42nd St., New York, N.Y. 10017
No Drawing. Filed Mar. 25, 1964, Ser. No. 354,774
Int. Cl. D21c *11/12*
U.S. Cl. 23—48                                         10 Claims

This invention relates to the treatment and utilization of spent liquor from pulp making processes, and more particularly to methods of treating the spent liquor so that it may be pumped with less friction, without leaving deposits and burned with greater efficiency.

There are three major pulping processes for the production of pulp. These are sulfate (kraft) process, the sulfite (Sivola) process, and the soda process. In the United States approximately 70 percent of the pulp produced is by the sulfate process, 25% by the sulfite process, and 5% by the soda process. As is known in the art, recovery of pulping chemicals from the sulfate and soda processes may be accomplished on a somewhat different basis than for the sulfite process. Aside from these considerations, however, the three major pulping processes all employ similar basic steps with chemical recovery, recycling, and combustion of the spent liquors, the chemical recovery being a very important economic part of each process.

In making pulp, wood in chip form or other cellulose material is processed in large digester-cookers which hold up to 50 tons or more of such wood chips. Alkaline compounds such as sodium sulfate and caustic soda are introduced into the digester-cookers together with steam under high pressure. The mixture of wood chips and alkaline digestion solution is cooked under high temperatures for 3 to 4 hours to separate the cellulose from the lignin, sugars and other non-cellulose substances in the wood. After this period of cooking or digestion, the wet cellulose fibers are separated from the digestion solution for further processing in the paper making process. At this point the digestion solution is spent liquor. The lignin and other organic compounds contained in the liquor are dark in color and hence the spent liquor is commonly called "black liquor." The black liquor constituents are used to generate heat. The inorganic substances in the liquor are recovered as molten ash or smelt, the smelt being tapped from the furnace and dissolved in the dissolving tank to form "green liquor." The green liquor is causticized with lime $(Ca(OH)_2)$ to convert sodium carbonate to sodium hydroxide while the sodium sulfide remains unchanged. The "white liquor" thus attained is now ready for reuse in the digester. The calcium carbonate sludge precipitating from the white liquor is burned to lime in a kiln and can be used to causticize the green liquor to white liquor again, completing the cycle.

The smelt flowing from the smelt hearth into the dissolving tank consists mainly of sodium carbonate $(Na_2CO_3)$, some caustic soda (NaOH), sodium sulphite $(Na_2SO_3)$, salt cake $(Na_2SO_4)$, sodium silicate $(Na_2SiO_3)$.

The recover the digesting chemicals and to utilize the lignin and other residuals of black liquor, it is subjected to the following recovery process. The black liquor is concentrated by evaporation from about 15% solids (weak liquor) up to about 65% solids (heavy liquor). As the black liquor becomes more and more concentrated, its high viscosity requires that the black liquor be heated so that it will flow more readily through the pipes, valves, pumps and nozzles without plugging and deposition of solids. The chemical treatment of various types of wood results in black liquors of varying solid content and viscosities and it is advantageous to concentrate the liquors to as high a solid content as possible without precipitation or deposition in the recovery cycle.

The concentrated black liquor then is pumped to the mixing tank where sodium sulfate (salt cake) is added to the liquor to make up for the chemicals lost in the pulping cycle. Salt cake from the boiler hoppers and precipitators is likewise returned to the cycle. Because of its high viscosity more power is required to pump and move the black liquor through the piping of the recovery system. The percentage of solids in the liquor is thus limited and the pumping power requirements add to the cost of the recovery process.

The concentrated black liquor is then burned in a large recovery furnace. The lignin, sugars and other organic substances support combustion, and the inorganic chemicals from the digester are recovered from the furnace as molten ash or smelt. Black liquor combustion thus furnishes an auxiliary source of steam for the pulp making process.

In the recovery furnace the black liquor is sprayed into the combustion zone for burning. Some black liquor, when sprayed into the combustion chamber, burns in suspension; most is deposited on furnace walls where it dries and burns and drops as char to the smelt hearth. Here the final combustion and reduction of sodium sulfate to sodium sulfide takes place. It frequently happens that the furnace gas velocities are so strong that black liquor, unburned, is sucked upwards towards precipitators and tubes, where it forms pernicious deposits with salt cake and molten ash, frequently plugging air passages. When not enough heat is generated when burning black liquor the char at the smelt floor may become gummy and stop burning, forming so-called "jelly rolls," causing trouble in the reduction of the sodium sulfate to sodium sulfide, besides interfering with proper burning operations. Because of the high viscosity of the black liquor, even at elevated temperatures, the concentrated liquor ignites and burns slowly, and unburned black liquor is deposited on the interior surfaces of the furnace, and particularly on the steam boiler tubes. The deposition of unburned black liquor on the furnace interior and boiler tubes causes several problems. Slag deposits formed on the boiler tubes interfere with heat transfer and substantially reduce the efficiency of the recovery furnace. Such unburned black liquor and slag deposits, if permitted to remain on the boiler tubes, plug up the furnace and must be removed manually at considerable expense.

The black liquor is sprayed through oscillating nozzles into the recovery furnace and with prior art practices it is very difficult to break up the high viscosity liquor into droplets suitable for efficient combustion. In prior art practices some of the black liquor sprayed into the furnace is not properly burned and charred, and that portion of the black liquor and chemicals which are not properly burned and charred adhere to the boiler tubes and other parts of the recovery furnace as slag, causing decreased thermal efficiency and the need for frequent manual boiler tube cleaning.

In order to remove the slag deposits, hand lancing by furnace operating personnel has been required, and soot blowers have been employed, with supplementary hand lancing required to remove these slag deposits from the boiler tubes. The prior art practices require a substantial amount of manpower and accordingly add considerable expense to the pulp making process. Further, hand lancing may result in a boiler tube break with the attendant dangers of explosion if such operations are not properly performed.

Another prior art approach to the problem of black liquor deposition has been the deposition of slurries, such as a magnesium oxide, on the boiler tubes to aid in separating the black liquor slag deposits therefrom. Such prior art practices, however, still require a systematic spraying schedule and substantial soot blower operation in order to remove the deposits. Further, while the deposits are on the boiler tubes, the heat transfer efficiency of the tubes is substantially reduced as noted above.

Accordingly, it is an object of this invention to provide methods for the handling and burning of black liquor from pulping processes.

Another object of the invention is to provide methods of the above character wherein the black liquor may be moved through piping more economically.

A further object of the invention is to provide methods of the above character wherein black liquor recovery boilers may be operated more economically.

Another object of the invention is to provide methods of the above character which may be practiced with existing pulp making mills and systems.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

I have found that the viscosity of the black liquor can be economically reduced for more efficient flow through pumps, valves, pipes and nozzles in the paper making process. Normally the black liquor is heated to reduce viscosity but there is a practical temperature limit to which the black liquor can be heated. My invention comprises the addition of finely divided light metal or metals above hydrogen in the electromotive series particularly such metals as aluminum, magnesium zinc or titanium either singly or in combination to the black liquor during the recovery process. The finely divided light metals, when mixed with the black liquor evolve hydrogen which substantially lower the viscosity of the black liquor as it flows through the recovery system. The hydrogen is formed in tiny bubbles throughout the black liquor and provides buoyancy to the liquor and suspended particles.

The lowering of black liquor viscosity because of such additions and the resulting formation of dispersed gas bubbles serves a twofold purpose. The black liquor flows much more freely and can be more efficiently handled and moved through the recovery system. The lowering of the viscosity by the finely dispersed gas will also permit higher concentrations of solids in the black liquor. The second purpose of lower black liquor viscosity is that more efficient burning and recovery of chemicals from the black liquor is made possible.

The black liquor viscosity is substantially lowered and it may be sprayed into the recovery furnace in the form of significantly smaller combustion droplets. With these smaller particles, the problem of slag-forming, unburned black liquor is reduced.

I have also found that the addition of relatively coarse metal particles along with the finer metal particles provides a combustion aid for the black liquor which further ensures proper combustion in the recovery furnace. The finer particles produce the viscosity lowering gas throughout the black liquor while the larger particles not only evolve gas but are also introduced as metal into the recovery furnace and are burned as a combustion aid with the black liquor.

Finely divided aluminum is preferred as the light metal additive since magnesium, titanium, and like metals are somewhat more expensive. The finely divided aluminum may be added alone or in a mixture with other finely divided metals. I have found that a mixture of finely divided aluminum with approximately one-third of the particle sizes being 250 to 325 mesh and the remainder coarser than 250 mesh, preferably about 80 to 100 mesh, gives very good results. Such a mixture may be added to the black liquor in amounts of from .25 to 5 pounds of metal or metals to 10,000 pounds of black liquor and preferably in a ratio of about 1:10,000 by weight. The finely divided aluminum is preferably added to the mixing tank along with salt cake ($Na_2SO_4$); however it can be added to and mixed with the black liquor at other points in the recovery system preferably after evaporation.

While the preferred ratio of fine to coarse aluminum particles may be approximately one-third to two-thirds for black liquors having 40 to 60 percent solids, the proportions may be varied depending upon the viscosity and percentage of combustible materials in the black liquor. For most pulping processes at least 20 percent of the particulated aluminum should be smaller than 250 mesh. The black liquor is moved through the recovery system relatively quickly and the use of very fine aluminum particles permits faster hydrogen-evolving action in the liquor. If the particles are too large the small amount of gas evolved may not materially affect the black liquor viscosity before it reaches the recovery furnace.

In practice, a typical paper mill processes several million pounds of black liquor every day. I have found, for example, that when 200 pounds of finely divided metals such as alunum are mixed proportionately to 2 million pounds of black liquor, that slag deposits and fouling of boiler tubes in the recovery furnace are substantially eliminated. Not only was the boiler tube cleaning time greatly reduced, but it was found that approximately 10 percent more steam was generated over that produced with prior art practices.

The amount of finely divided metal required, and the proportions of coarse to fine metal particles added will depend upon a number of factors. If the black liquor is "strong," i.e., containing a higher percentages of solids, then a proportionately higher amount of finer metal particles may be used. With weak black liquor, it has been necessary in prior art practices to add oil thereto to keep it burning. The present invention greatly reduces the need for such auxiliary fuels.

With the addition of the hydrogen-evolving metals such as finely divided aluminum, the black liquor is not only more efficiently pumped and burned, but the particulate aluminum also scavenges available oxygen in the recovery furnace and aids in the reduction of sodium sulfate to sodium sulfide. This reduction is an important part of the recovery process. Further, the enhancing of combustion by the aluminum particles and improved burning greatly reduces the possibility of flame fade-out and explosions. It has also been found that proper burning and charring of the black liquor reduces the amount of carbon passed through the electrostatic precipitator. The precipitator thus functions more effieciently and reduces the amount of $Na_2SO_4$ and other air pollutants which issue from the smokestack.

While aluminum, magnesium, titanium and zinc have been specifically cited as metals which may be added to the black liquor, it should be understood that other gas-evolving particulate material can be added to the black liquor in practicing the invention. The particulate material should not undesirably react with the smelt or require more expensive processing to recover the chemicals for recycling through the digestion phase of the pulp making process.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. The method of treating spent liquors from pulp making, comprising the step of adding a finely divided gas-evolving material containing at least one metal above hydrogen in the electromotive series to the spent liquor, whereby said material evolves a gas when mixed with the spent liquors and lowers the viscosity thereof.

2. The method of treating spent liquors from pulp making, comprising the steps of,
 (A) adding a finely divided metal to the spent liquors,
  (1) said metal being taken from the group consisting of aluminum, magnesium, titanium or zinc,
 (B) mixing the finely divided metal into the spent liquor and then
 (C) burning the spent liquor and finely divided metal.

3. The method defined in claim 2 wherin said finely divided metal consists of particles smaller than 80 mesh.

4. The method defined in claim 3 wherein at least 20% of said finely divided metal consists of particles smaller than 250 mesh.

5. The method defined in claim 2 wherein said finely divided metal is proportionately added to said spent liquor in a ratio of from 1:40,000 to 1:2,000 by weight.

6. The method of processing and utilizing spent black liquor from pulp making processes, comprising the steps of
 (A) concentrating the black liquor,
 (B) mixing a finely divided, hydrogen-evolving metal with the black liquor then,
 (C) burning said mixture.

7. The method of treating spent black liquor from pulp making processes, comprising the steps of
 (A) separating the black liquor from the pulp,
 (B) concentrating the black liquor,
 (C) mixing finely divided metal with said black liquor,
  (1) said metal being taken from the group consisting of aluminum, titanium, zinc or magnesium,
  (2) said finely divided metal having particle sizes smaller than 80 mesh, and then
 (D) burning said black liquor and finely divided metal mixed therewith.

8. The method of processing and utilizing spent black liquor from pulp making processes, comprising the steps of
 (A) mixing finely divided aluminum with said black liquor
  (1) after separation from the pulp,
  (2) said finely divided aluminum essentially consisting of particle sizes of from 80 to 325 mesh and then
 (B) burning the black liquor and said divided aluminum together.

9. The method defined in claim 8 wherein said finely divided aluminum is added to the black liquor in a ratio of from .25 to 5 pounds of aluminum to ten thousand pounds of black liquor.

10. The method of processing and utilizing spent black liquor from pulp making processes, comprising the steps of
 (A) introducing finely divided aluminum into said black liquor
  (1) said finely divided aluminum being a mixture
   (a) of approximately one-third of the particles being from 250 to 325 mesh in size and
   (b) approximately two-thirds of the particles being from 80 to 100, mesh, and then
 (B) burning said black liquor and said divided aluminum together.

References Cited
UNITED STATES PATENTS

| | | | |
|---|---|---|---|
| 738,398 | 9/1903 | Besson | 23—143 X |
| 1,852,264 | 4/1932 | Rinman | 162—30 |

OSCAR R. VERTIZ, *Primary Examiner.*

G. T. OZAKI, *Assistant Examiner.*

U.S. Cl. X.R.

162—29, 32